United States Patent
Khaitan et al.

(10) Patent No.: US 9,207,735 B2
(45) Date of Patent: Dec. 8, 2015

(54) POWER MANAGEMENT DEVICE AND SYSTEM

(75) Inventors: Yashraj Khaitan, Berkeley, CA (US); Jacob Dickinson, Berkeley, CA (US)

(73) Assignee: Gram Power, Inc., Berkeley, CA (US)

( * ) Notice: Subject to any disclaimer, the term of this patent is extended or adjusted under 35 U.S.C. 154(b) by 655 days.

(21) Appl. No.: 13/556,532

(22) Filed: Jul. 24, 2012

(65) Prior Publication Data

US 2013/0035802 A1    Feb. 7, 2013

Related U.S. Application Data

(60) Provisional application No. 61/514,103, filed on Aug. 2, 2011.

(51) Int. Cl.
| | | |
|---|---|---|
| G05D 17/00 | (2006.01) | |
| G05B 15/02 | (2006.01) | |
| G05B 11/01 | (2006.01) | |
| G06F 19/00 | (2011.01) | |
| H01L 31/00 | (2006.01) | |
| G06F 1/26 | (2006.01) | |
| H02J 3/32 | (2006.01) | |
| H02J 3/38 | (2006.01) | |

(52) U.S. Cl.
CPC . *G06F 1/263* (2013.01); *H02J 3/32* (2013.01); *H02J 3/383* (2013.01); *H02J 3/386* (2013.01); *H02J 3/382* (2013.01); *Y02E 10/563* (2013.01); *Y02E 10/566* (2013.01); *Y02E 10/763* (2013.01); *Y02E 70/30* (2013.01)

(58) Field of Classification Search
CPC ......... G06F 1/2693; H02J 3/383; H02J 3/386; H02J 3/32; H02J 3/382; H02J 3/38; H02J 3/28; H02J 7/0013; H02J 2003/146; Y02E 10/763; Y02E 10/566; Y02E 10/563; Y02E 70/30; G05B 13/02; Y02B 70/3225; Y04S 20/244; Y04S 20/222
USPC ............... 700/286, 9, 22, 108, 109, 295, 297; 136/243–265
See application file for complete search history.

(56) References Cited

U.S. PATENT DOCUMENTS

| | | | | |
|---|---|---|---|---|
| 6,005,476 | A  * | 12/1999 | Valiulis | 340/12.32 |
| 6,118,269 | A  * | 9/2000 | Davis | 324/110 |
| 7,095,032 | B2 * | 8/2006 | Montagu et al. | 250/458.1 |
| 7,106,044 | B1 * | 9/2006 | Lee et al. | 324/110 |

(Continued)

OTHER PUBLICATIONS

McLaughlin et al., "Energy Theft in the Advanced Metering Infrastrucuture", 2009 Systems and Internet Infrastructure Security Laboratory (SIIS) Pennsylvania State University, University Park, PA, 12 pages.*

*Primary Examiner* — Robert Fennema
*Assistant Examiner* — Thomas Stevens
(74) *Attorney, Agent, or Firm* — Goodwin Procter LLP

(57) ABSTRACT

A smart power grid system and power management system including at least one intelligent user-side power management device (PMD) to eliminate power theft and efficiently provide clean energy to the users of the grid while helping the grid to do smart demand response management, particularly for renewable energy based grids that need to efficiently manage the slack due to the large variability in power generation through these energy sources, the PMD including a controller, a circuit protection device, a metering device, a local power storage device, a grid communication interface, and switches to prevent overloading and illegal consumption of power.

26 Claims, 7 Drawing Sheets

(56) References Cited

U.S. PATENT DOCUMENTS

Figure 1:
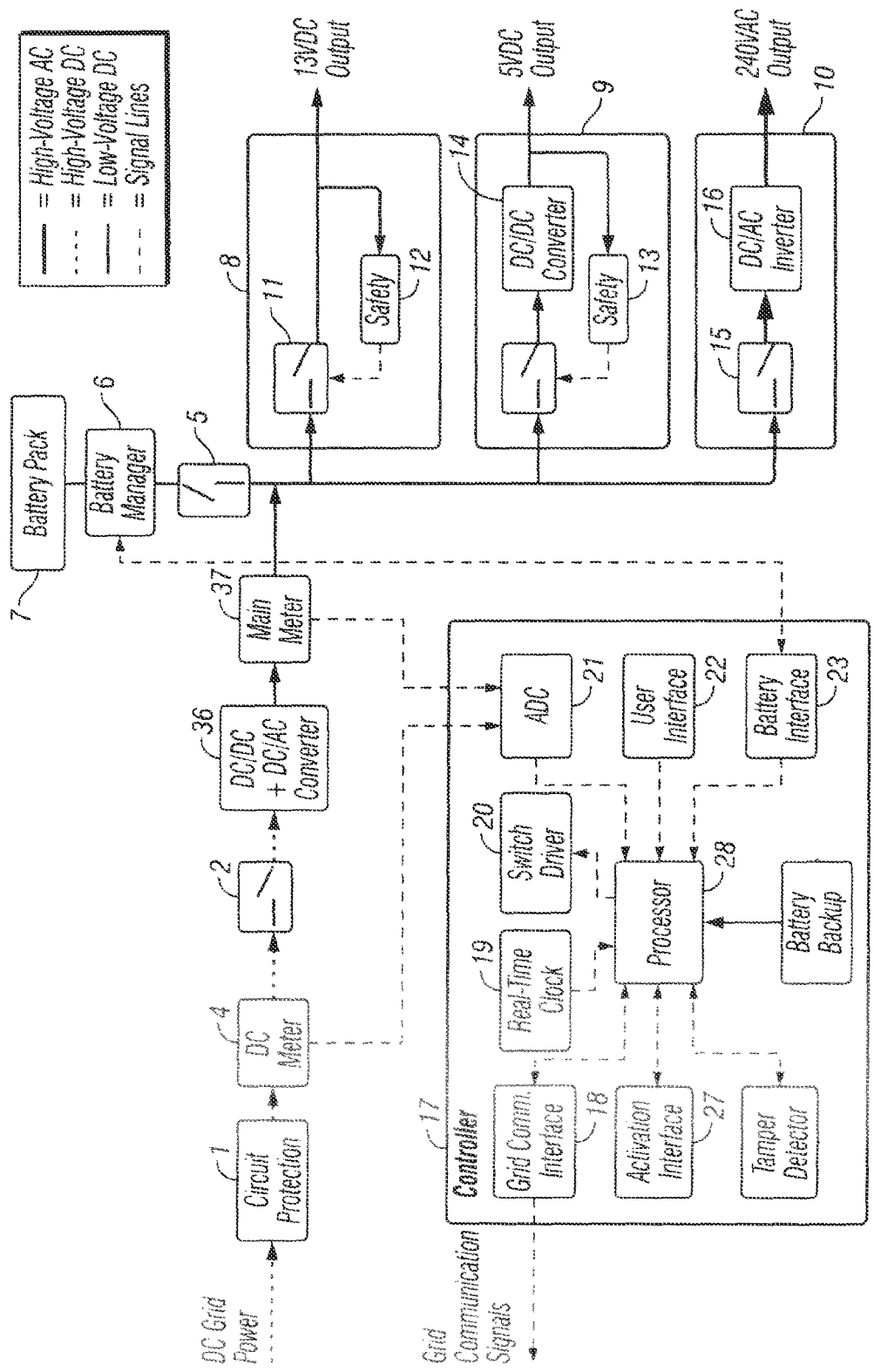

| | | | |
|---|---|---|---|
| RE40,032 E * | 1/2008 | van Bokhorst et al. | 455/343.2 |
| 7,936,163 B2 * | 5/2011 | Lee, Jr. | 324/110 |
| 8,452,555 B2 * | 5/2013 | Swarztrauber et al. | 702/62 |
| 8,781,640 B1 * | 7/2014 | Miller | 700/297 |
| 8,818,742 B2 * | 8/2014 | Ansari | 702/61 |
| 2002/0036430 A1 * | 3/2002 | Welches et al. | 307/18 |
| 2002/0130768 A1 * | 9/2002 | Che et al. | 340/310.01 |
| 2009/0187284 A1 * | 7/2009 | Kreiss et al. | 700/291 |
| 2010/0045232 A1 * | 2/2010 | Chen et al. | 320/109 |
| 2010/0207448 A1 | 8/2010 | Cooper et al. | |
| 2012/0080942 A1 | 4/2012 | Carralero et al. | |
| 2012/0175955 A1 * | 7/2012 | Carralero et al. | 307/38 |
| 2014/0379156 A1 * | 12/2014 | Kamel et al. | 700/291 |

* cited by examiner

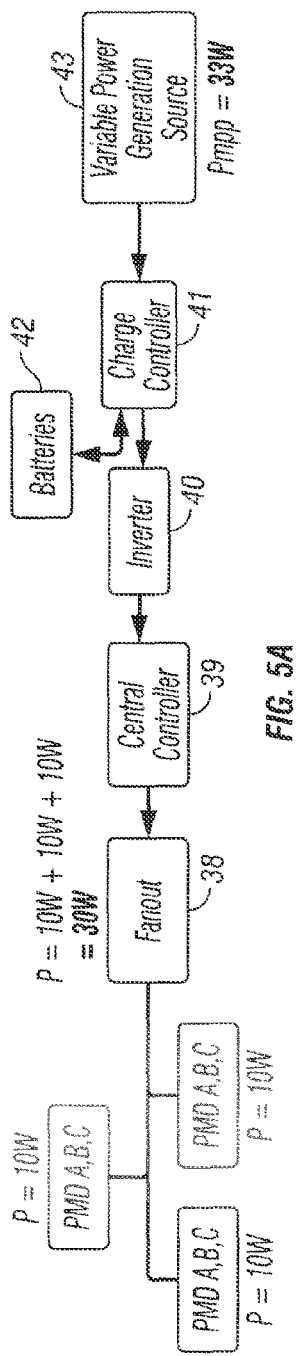
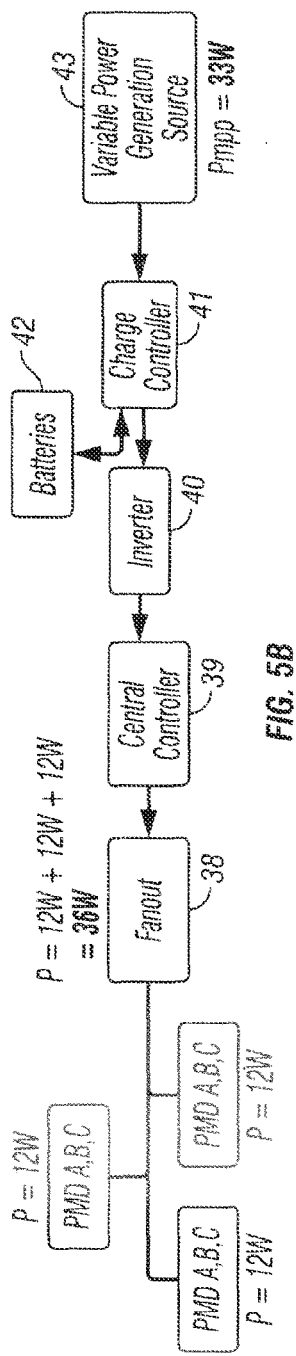
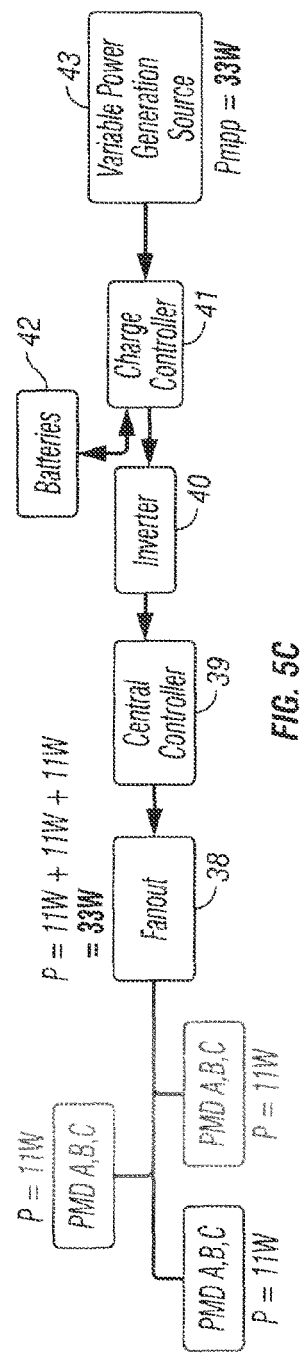
FIG. 5A
FIG. 5B
FIG. 5C

POWER MANAGEMENT DEVICE AND SYSTEM

CROSS REFERENCE OF RELATED APPLICATIONS

This application claims the benefit of U.S. provisional application No. 61/514,103 filed on 2 Aug. 2011 which is hereby incorporated by way of reference. This application further acknowledges the prior patent application U.S. Ser. No. 13/100,957 filed by the same applicant on May 4, 2011 and is hereby incorporated by way of reference in this patent application.

FIELD OF THE INVENTION

The present invention relates to the power management of mini grid systems for use in power management units and/or device system arrays, which can be activated externally for a temporary period or permanently, and that is plugged in and/or rechargeable and portable. It can be utilized with a whole range of energy sources that provide either fluctuating (like solar panels, dynamos and the like) or constant power (like a wall adapter or utility grid) as output. In addition the power management devices (singular and/or multiple power management units/devices in operation may be referred to and configured as such for use as a power management system) are capable of being stackable and built with theft deterrence and overload detection capabilities. They are enabled to output a variety of voltages and variable amount of power that may be used to run a variety of end appliances, including cellular telephones, personal stereos, memo recorders, televisions, lights, computers, fridges.

BACKGROUND OF THE INVENTION

The renewable energy boom during the recent past has brought some significant advances to the energy sector, but renewable technologies and the conventional electricity grid are not necessarily suited for each other. A couple of major problems exist in this area. First, the modern grid operates on AC power, while renewable sources for example, solar panels generate DC power. The conversion from DC to AC creates avoidable inefficiencies in the grid, which is further aggravated when the power is converted from AC back to DC to operate modern DC appliances such as cell phones, laptops, and LED lamps.

A second problem with renewable sources is their inherent variability in power output for example, solar panels being shaded, which warrants large amount of storage in order to ensure a consistent and reliable power delivery to the nodes of the grid. In particular, duration of power supply (number of hours in a day) in rural areas of developing countries and quality of supply (voltage and frequency) is highly uncertain and intermittent. This is both expensive and difficult to scale for the grid operator. Furthermore, traditional grids suffer from power theft, making the already-expensive renewable energy sources even more expensive. For example, in India energy theft is a major issue in rural communities, where distribution companies incur AT&C losses of over 58% most of which is due to theft and pilferage.

Moreover, the electricity distribution companies in these areas charge consumers a minimum fixed monthly fee irrespective of power supply/consumption. Thus, in several cases people pay more for electricity than what they actually consume just to maintain the connection. Most electrical appliances today are DC powered and the most promising renewable source of power is—'Sun' which too generates DC power. Thus, in areas where generation and most of the consumption is in DC, there is a need for DC transmission and distribution to reduce power losses through several layers of conversion.

Prior art patent publications US 2010/0207448 A1 and US 2012/0080942 A1 are considered as relevant to the present invention. However, the cited prior art basically describe ideas and concepts rather than concrete technical solutions to the problems. These ideas and concepts have been discussed in several publications prior to the disclosure of the admitted prior art.

However, the existing grids supplying A.C. power or hybrid power (combination of A.C. & D.C. power), suffer from distribution problems. In particular, quantum of generation of non-conventional and variable voltage power (D.C.) is not constant due to natural uncertainty. Further, the A.C. supply from the grid is totally irregular particularly in rural areas, and so is the situation for hybrid supply. In gist, there is no reliable system and process available for AC or DC power distribution to ensure equitable and substantially regular power supply by eliminating power theft, and maximizing the generation/distribution efficiency by implementing distributed maximum power point tracking and intelligent energy demand response techniques.

The foregoing examples of the related art and limitations related therewith are intended to be illustrative and not exclusive. Other limitations of the related art will become apparent upon a reading of the specification and a study of the drawings.

SUMMARY OF THE INVENTION

It is therefore, an object of the present invention to propose a smart power grid comprising one or more sources of energy generation that may supply constant or variable amounts of power, a central controller with optional remote monitoring capabilities that can control a cluster of power management devices (PMDs) that are used for efficient monitoring, controlling, metering, equitable distribution of electrical power to the consumers corresponding to different energy demand-generation scenarios, and eliminate power theft.

Another object of the present invention is to propose at least one PMD with optional internal storage capacity interfaced with the smart power grid acting as distributed storage to allow amortization of storage cost across all users in the smart grid that in turn reduces the capital and operating costs for the grid owner.

A still another object of the present invention is to propose at least one PMD interfaced to a smart grid which is enabled to accommodate external storage device to increase storage capacity.

A further object of the present invention is to propose at least one PMD interfaced to a smart grid, which is configured to implement an effective demand-response management on the smart microgrid and equitable power distribution, to several appliances including devices such as refrigerators, air conditioners, heaters, having inherent slack to supplement or act as the primary storage attached to the PMD.

A still further object of the present invention is to propose a PMD that uses the voltage on a grid and is enabled to convert the supply voltage into useful DC, AC, or hybrid voltages to operate a large variety of consumer appliances.

Yet another object of the present invention is to propose a PMD that optionally comprises internal, external or hybrid storage, which can be used for remote slack management by the smart grid to control charging and discharging of this storage to provide reliable power to consumers even during low generation levels without significantly investing on central storage facility.

Another object of the present invention is to propose a PMD, which is enabled under wired or remote communications mode with the central grid controller to achieve maximum power point tracking of variable power generation sources in a distributed manner without additional devices as of prior art.

A still another object of the present invention is to propose a process for automatic detection of power theft during transmission, distribution and consumption of power through a PMD interfaced to a smart grid.

Yet another object of the present invention is to propose a PMD with means for metering the generation and consumption of power including processing of deposit/credit/outstanding payment data.

A further object of the present invention is to propose a PMD that allows the users to increase local storage and consumption or decrease the power consumption corresponding to increased/decreased power supply.

BRIEF DESCRIPTION OF THE ACCOMPANYING DRAWINGS

FIG. 1—shows a block diagram of a Power Management device (PMD) interfaced to a DC-micro grid according to the invention.

Figure 2:
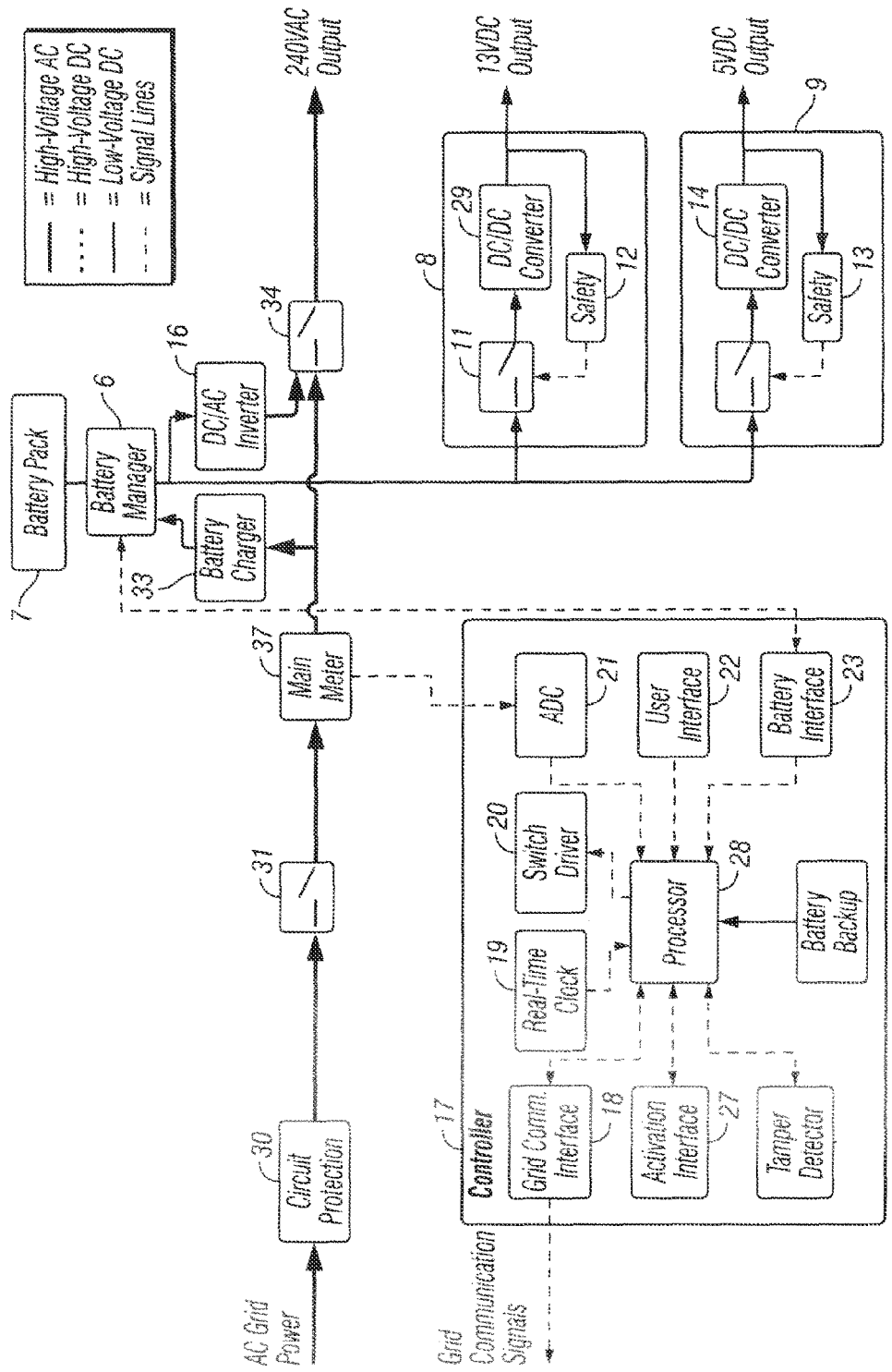
Figure 3:
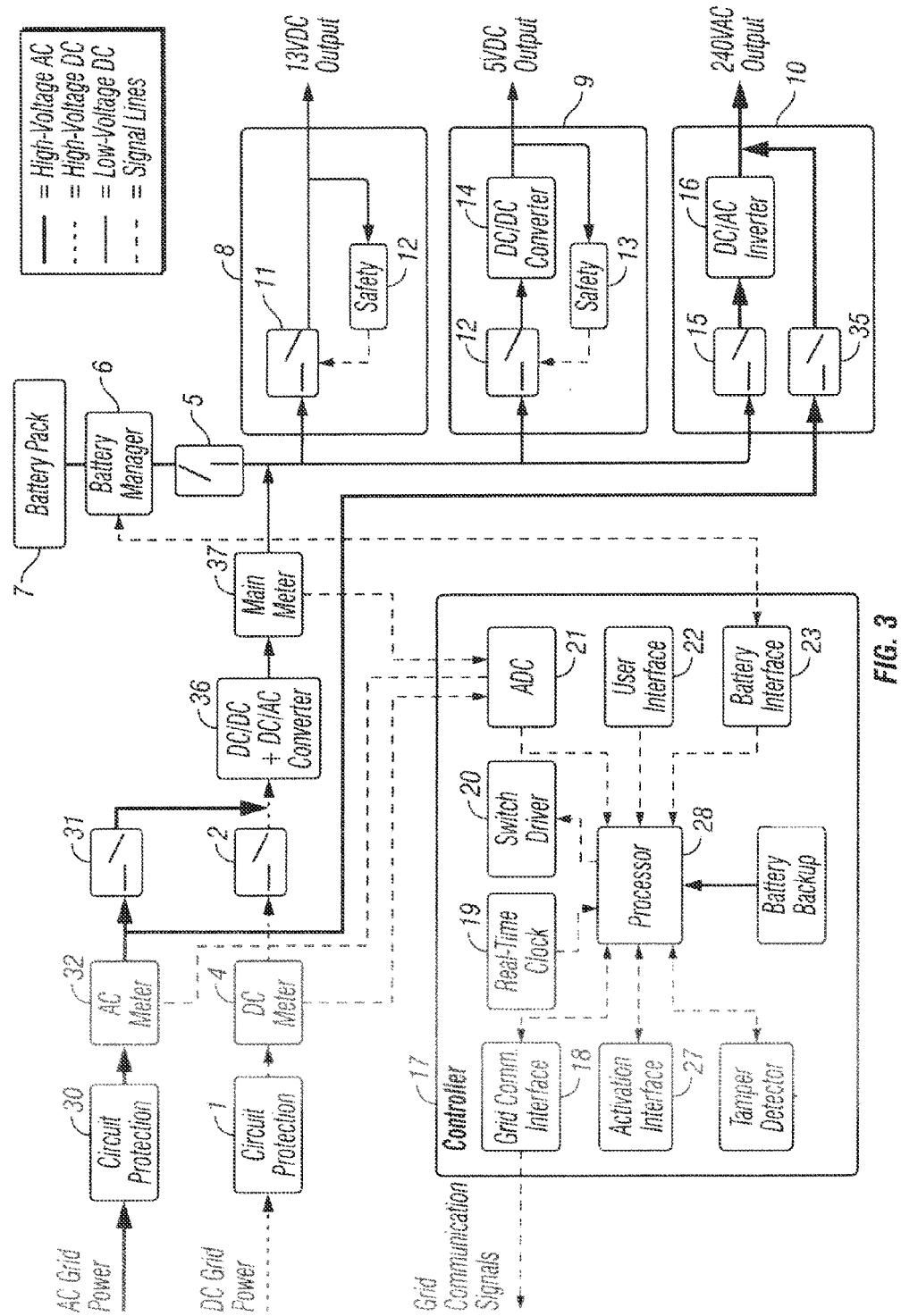
Figure 4:
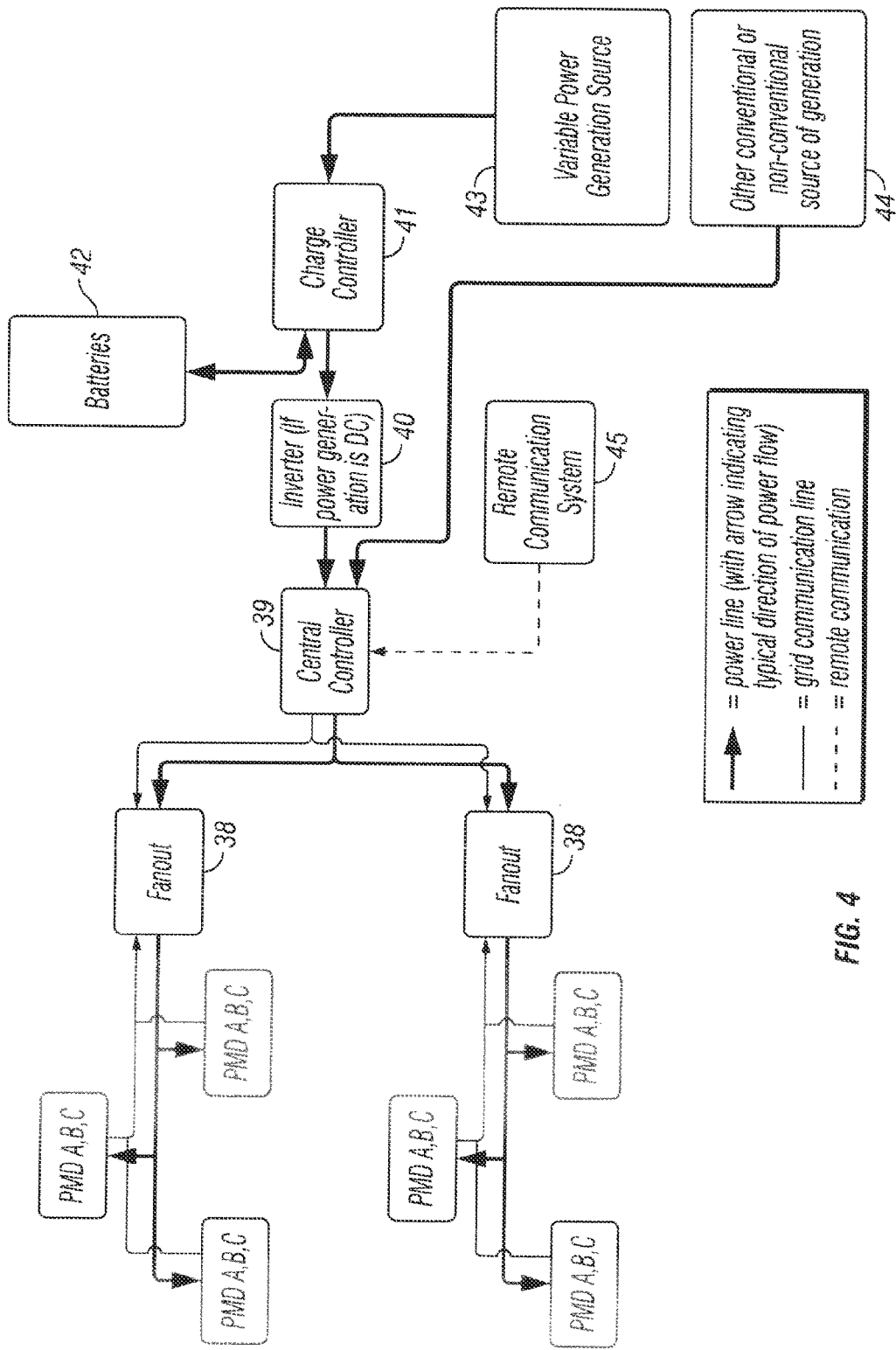

FIG. 2—shows a block diagram of a Power Management device (PMD) interfaced to an AC-micro grid according to the invention FIG. 3—shows a block diagram of a Power Management device (PMD) interfaced to a hybrid grid (AC+DC) according to the invention FIG. 4—shows an architecture of the smart grid of the invention with centralized storage and PMDs with their internal distributed storage.

FIGS. 5A,5B,5C—schematically show a process for implementing maximum power point tracking under different generation consumption conditions according to the invention.

Figure 6A:
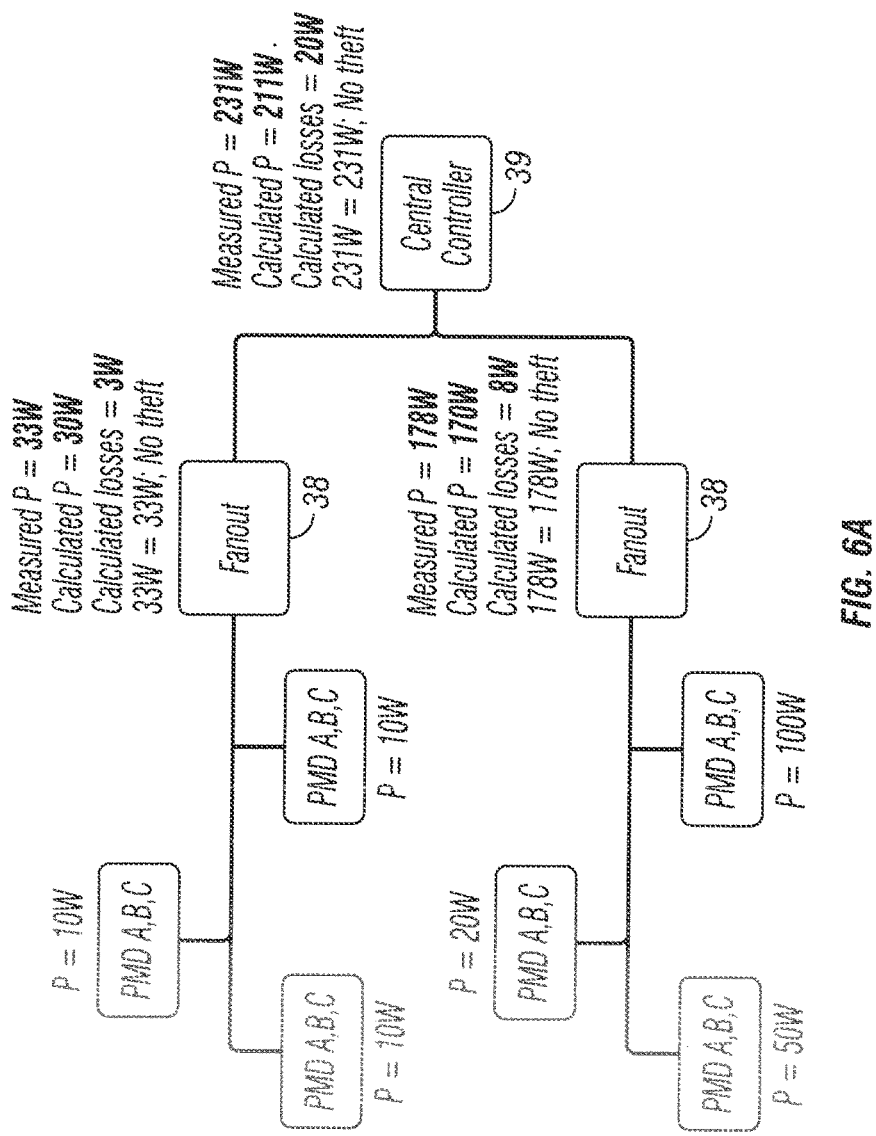
Figure 6B:
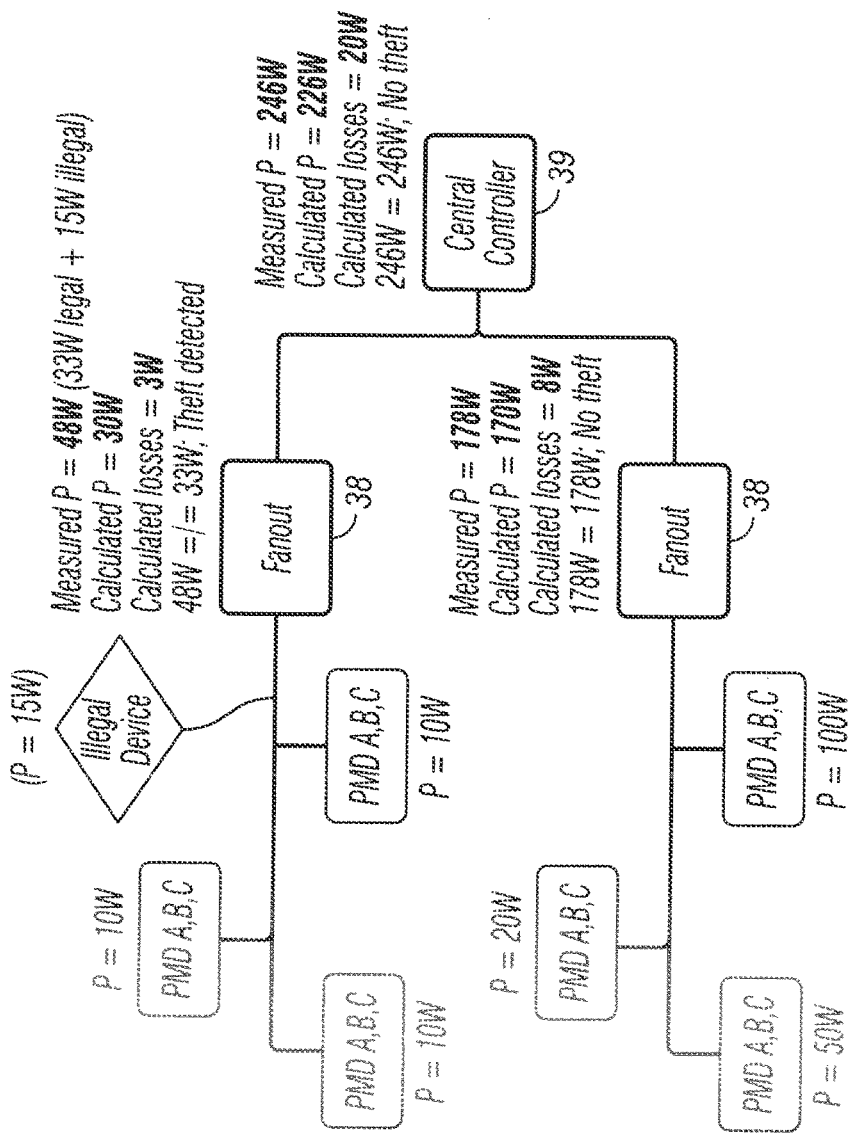

FIGS. 6A & 6B—schematically illustrate the process of theft detection according to the invention.

DETAILED DESCRIPTION OF THE INVENTION

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Accordingly, there is provided a Power Management Device (PMD) that can be interfaced to a smart microgrid (using AC or DC power, or hybrid power) to address the prior art problems. The smart microgrid is configured to be of modular construction such that it can cater for as few as tens of PMDs vis-à-vis consumers and expanded to operate as a utility grid by combining several smart microgrids with communication means provided between them. This modularity interalia makes it feasible to provide grid power without incurring huge capital expense of extending the utility grid to remote areas. The invention described herein is an intelligent user-side Power Management Device (PMD) for a smart microgrid that may use distributed storage.

The smart microgrid of the invention works with A.C, D.C., and hybrid power, from source to appliances. The grid is capable of working but not necessarily limited to solely working on the premise of distributed storage in which each household or business contains its own energy storage, amortizing the cost of energy storage across the entire user base and allowing for seamless scaling. The smart microgrid has a very low susceptibility to power theft. Further, the invention allows implementing the techniques of distributed storage and maximum power point tracking without the use of any additional devices. The smart microgrid according to the invention comprises at least the following:

One or multiple conventional or non-conventional power generation sources that may generate constant or variable amounts of power for example, solar, wind, biomass, micro, hydro, and the existing power supply from the grid.

Distribution wiring that takes power from the generation station to one or more fanouts, the fanouts acting as intermediate distribution stations for a cluster of consumers. From the fanouts, power is distributed to the consumers who each have a PMD.

A central controller located close to the generation source that meters the total amount of power going into the microgrid and communicates with every fanout. The fanout meters the power going through it and communicates with every PMD that is distributing power through it. All this local communication is done using a medium that can be wired, wireless or a combination thereof as the communication protocols used by the PMDs can be customized for any communication medium. The PMD is designed to work with pure AC power, pure DC power or a combination of the two, thereby catering to all forms of power generation in a most efficient manner. Each PMD among other features is provided with at least one microcontroller which is independent of whether the input power is AC or DC, or hybrid.

The central controller can comprise a GSM module to do wireless communication with a remote central server where all information collected in the microgrid is stored. This server is connected to the internet to allow grid operators to monitor microgrid operation remotely. The central server also sends commands to the GSM module to communicate with any specific PMD, and further to troubleshoot the technical problem of the microgrid or turn it on/off. The central controller can also use any other technology for communication to the remote central server such as radio, CDMA, wired communication using Ethernet etc.

The PMD is capable of accepting DC, AC, or a hybrid power backing of inputs, provides metering information to the grid for power usage, outputs different DC voltages and a standard AC voltage to operate a wide variety of appliances, communicates with the grid for slack management and safe operation, charges the backup internal storage to provide power during grid downtime, and provides a user interface to give relevant information to the user. Furthermore, it can be activated and deactivated to allow controlled levels of consumption, i.e., the device will remain active until a certain amount of power flows through it, similar to how a pre-paid cell phone remains active until the account runs out of balance. When the PMDs are used in a plural manner a distributed power storage network results in creating the basis for a power management system.

In one embodiment, for AC input into the PMD, three levels of circuit protection are provided. For example:

A varistor is used in parallel to the supply to protect the circuit from voltage spikes.

A fuse (resettable or non-resettable) or a circuit breaker is put in series of power supply to prevent current spikes.

In the main meter, a current transformer meters the current flow in the circuit. If the current flow exceeds a threshold limit, the micro controller shuts off the relay to protect the internal circuit of the PMD including the appliances the PMD is powering To meter AC power, as seen in FIG. 2, the PMD samples the voltage and current of the incoming AC waveform. The sampling rate is selected to be more than double the frequency of the waveform to prevent aliasing. The micro controller reads these values through its Analog to Digital Interface. The voltage is read using a step down transformer and a voltage divider. The transformer provides magnetic isolation between the power and controller circuitry to protect the digital circuits.

Another way to measure the voltage is to adapt a voltage divider and optocouplers that use different power supplies to isolate the digital circuitry from surges in the power circuitry. The current is measured using a current transformer. It can also be measured using a current sense resistor, hall effect sensor. There are also integrated circuits available for metering AC power which can also alternatively, be used in the PMD for metering the power going through it.

The power inputted through the main meter, in one embodiment, is caused to:

output 5VDC and 13VDC by using DC-DC converters. The DC-DC converter for 13VDC output can however, be eliminated if the user does not need strict voltage regulation. In this case, this output can be directly connected to the local 12V storage that the PMD charges and the voltage will fluctuate corresponding to change in storage voltage, operate a variety of standard AC appliances, charge the local storage through an AC-DC charger.

According to this embodiment as depicted by FIG. 2, the DC outputs are generated through current limited DC-DC converters. When the output current goes beyond this current limit, the voltage drops to maintain the power output as constant. This voltage is compared against a threshold using an analog comparator and when it goes below the threshold, the switch (a PMOS or NMOS) is turned off by changing its gate voltage. Accordingly, output voltage can be safely controlled at a low cost.

The PMD comprises a battery charger having an AC to DC converter and a PWM controlled voltage feedback circuit to precisely monitor the output charging voltage of the converter. This charging voltage can be modified using a digital potentiometer, which is controlled by the micro controller. The micro controller receives signals from the smart grid to increase or decrease PMD's power consumption to which it responds by tuning the digital potentiometer. The digital potentiometer sets the negative feedback reference voltage of the battery charger, which alters the PWM of the circuit and changes the charging voltage.

The battery charger is calibrated such that a particular difference between charging and battery voltage leads to a particular amount of current flow into the battery. Hence changing this charging voltage can precisely control the amount of power going into the battery. Alternatively, this power can be controlled by using a current sense resistor, a current amplifier, and an analog comparator in addition to the AC-DC battery charger. The negative feedback reference voltage on the analog comparator can be changed to alter the PWM of the circuit and thereby change the amount of current flow into the battery. This local storage is attached to an inverter, which converts DC to AC. During the period, when the grid is unable to supply sufficient power to serve the loads, the controller switches to the inverter power thereby reducing the load on the grid. The grid sends this message to the PMD to switch to battery storage instead of grid power. However, the grid can continue to supply power to charge the battery as per power availability.

In another embodiment of the invention, when the input power to the PMD is high voltage DC for example, between 150-250VDC, which can however be increased or decreased by using an appropriate DC-DC converter inside the PMD to generate different useful voltages using the modified input voltage range, a large variety of renewable energy sources can be used to power the PMDs.

A circuit breaker in the form of a circuit protection is provided to prevent the internal circuitry of the PMD from being damaged due to a voltage spike in the grid or current surge due to a short-circuit on the user side. This circuit protection may be either a mechanical or electrical device, which disconnects the PMD from the grid in the event of such a spike, and only reconnects the PMD after some user action (i.e. flipping a switch, pushing a button, etc.) This is a similar concept to the circuit breakers commonly found in homes on normal AC grids; however the form of the circuit breaker may be different than conventional devices to suit the special requirements of a DC, or AC or a hybrid grid.

For example, circuit protection is done with unidirectional Zener diodes. It can also be done by using high power transistors whose gate voltages are controlled by a digital circuit that outputs high/low based on whether the input voltage is within the prescribed range or not. For example, a voltage divider network made of resistors can be used to measure the input voltage, which is compared against a threshold voltage using an analog comparator. The output of this comparator is connected to the gate of the transistor to turn it off when the grid voltage is beyond prescribed limits and keep it on till it returns within limits.

The DC-DC converter in the PMD has a dynamically adjustable output voltage. This voltage is also the charging voltage of the storage. Through grid communication, the PMD learns when it should consume more or less power and accordingly adjusts a digital potentiometer connected to the negative feedback node of the DC-DC converter. Tuning this potentiometer, the output voltage of the converter is changed, which in turn changes the power going into the battery, vis-a-vis the total power consumption of the PMD. No AC to DC converter is necessary here since the input power is also DC. This makes the system more efficient. Alternatively, any technique that allows one to change the PWM of the DC-DC converter can be used to tune the power going into the local storage.

The main meter uses voltage dividers to measure input voltage and current sense resistor technique to measure the current. In the All DC PMD(PMD-A), the controller does not have to measure any frequency, power factor, etc. because in DC, all power is real power. Each PMD is also programmed for a maximum allowed current through it. Whenever the meter senses a higher current, it turns the meter off for a few seconds and indicates overload through a red LED on the UI. The controller then turns on the meter back by switching on all the output switches. If the overload condition is removed, the meter stays in the on state, otherwise it repeats this behavior.

In one embodiment of the invention, the user interface (UI)(22), in the PMD provides the following data to the user:

Instantaneous power consumption on an LCD screen or through segmented displays based on readings from the metering module.

Total power left for consumption (in the case of prepaid power). This is determined by calculating the difference between the total power for which the PMU is activated and the amount of power consumed, which the PMU has measured since activation.

Power history: An optional on-device SD card or similar storage device can be provided to record the history of power consumption on the PMU. The SD card can then be inserted into a computer to read the history. Alternately, the data can be communicated through the modem on an online portal on the Internet or can be acquired by the central controller through grid communication.

Fault indicators are used on the casing of the PMU to display any communication errors or other fault conditions such as short circuit or overload. A reset button is provided on the PMU casing to return the device to normal operation after the fault has been remedied. The system is allowed to reset itself periodically in this state to check if the fault state is removed, in which case the system gets back to the normal state, else falls back into the fault state.

The PMD has an optional DC to AC inverter to cater to AC appliances as well. According to the invention, the internal storage can be any rechargeable battery pack as the DC-DC converter takes care of converting the input grid voltage to the appropriate battery voltage for charging and/or creating an output voltage to run appliances. The PMD-controller can be programmed to charge the particular battery that is used in the PMU. The controller also switches between charging, storing and discharging the battery based on its communication with the grid. An example of this communication is a 2-bit input stream that the grid sends to the PMD.

One bit determines whether the PMD can be charged or not and the other bit determines the priority to charge this PMD's storage as opposed to the storage of other PMDs in the grid. Based on the state of the battery and this input stream, the PMD controls the battery switches and allows the battery to charge or maintain its state. Depending on the state of the battery, the PMD also controls if the battery should be allowed to discharge or not in order to ensure that the battery does not over-discharge. An alternate example for how the communication for switching the battery could work is that the grid could just send a signal that determines how much of a PMD's battery should be charged. Thus, if the grid sends a signal representing 40%, all the PMDs would set a charging rate (allow more or less current into the battery) to get their batteries to reach 40% of their charged state. Since a programmable microcontroller in the PMD interfaces with the grid communication and controls the internal storage, the PMD can interface and adapt to any communication system/protocol that the grid designer or operator might want to use to manage its storage loads.

The DC output voltages and input voltage are connected in parallel to two different stacking connectors placed on the PMD. This allows two or more PMD units to be stacked on top of each other. Since input voltage is stacked, a single input cable can charge/monitor the associated storage of all stacked PMDs simultaneously, and the meter of the PMD that is directly connected to the grid will measure the total power going into all PMDs and communicate that back to the grid. By stacking the outputs, one can draw more power from a single output connector of the PMD stack as all the stacked PMDs can now provide power to the load connected to the specific PMD. Thus, if one PMD can supply 15 W through the 5VDC output, three PMDs can supply 45 W through the same 5VDC output after stacking.

The limit to how many PMDs can be stacked is determined by the power rating of the output connector, on which the power rating of the rest of the circuitry in the PMD is decided. Alternately, stacking can be implemented by disintegrating the controller, circuit breaker, meter, and DC-DC converter into one unit and the rest of the power management (storage, different DC and AC output voltages, A/D Comparator, switches) into another 'less intelligent storage unit'. Then a stack can comprise one of the former unit that connects to the grid and does the safety and metering, whereas the other units can act as the latter storage devices that are centrally controlled with this former unit. This can reduce the cost of stacking excess storage devices as the additional devices will have less functionality, which is being supplemented by the central controller.

In another embodiment of the invention, as can be seen in FIG. 3, the PMDs are enabled to operate under multiple power generation sources generating both AC and DC power and the consumption is both AC and DC. In this case, the PMD-microcontrollers are configured to perform the following additional functionalities:

The main meter (37) still meters total DC power going through the PMD to serve loads through the different DC outputs or the DC-AC inverter (16) to serve AC loads when AC power is not available. In addition, there is an AC meter (32) in the PMD that meters the AC power coming into it. This meter (32) is useful because if the load needs AC power and the supply is also AC, then the power can flow straight to the appliance through the 240 VAC output (10) and the inverter (16) switch can be opened. Whenever AC power is available and there is an AC load on the PMD, the inverter (16) is shut down to avoid energy losses and power flows straight from the AC meter (32) to the load.

The main converter used in this PMD is a DC-DC+AC-DC converter than can convert both kinds of power to a single 13VDC output that is used to charge the local storage and power a 5VDC output and the inverter.

The inventive PMDs are configured with an optional stacking feature as well. The PMDs have male/female stacking connectors, which allow multiple PMDs to be physically and electrically connected together. Once stacked, the DC and AC outputs of one PMD get connected to the other stacked PMDs. This allows the user to draw more power from the stacked outputs. To stack DC outputs, the DC voltages on the respective PMDs are connected together in parallel with each other. To stack AC outputs, each PMD has a 'phase syncor'. This phase synchronization, in one embodiment, is implemented by introducing delays in the AC wave such that the phase of the AC waves of the new PMD entering the stack is the same as those already existing on the stack before turning on the connection between the AC outputs.

According to an advantageous aspect of the invention, the PMD allows the consumers to purchase power using a prepaid model. For example, the consumers purchase energy credits to recharge their meters. These credit data can be transferred into the PMD using various options—wired communication, wireless communication using GSM, Bluetooth, infrared, or any other medium that allows data transfer into the PMD. The meter calculates the amount of power being consumed and keeps counting down these energy credits. When the PMD runs out of energy credits, the PMD-controller turns off the main switch/relay to avoid any further power consumption.

As soon as the PMD is recharged with credits, the switch turns back on and power starts flowing again. This prepaid purchase model has the following advantages:

It allows the users to pay for exactly the amount of power consumed; it eliminates payment defaults; and it makes the users aware of their power consumption, which tends to reduce energy wastage In another advantageous feature of the present invention, the smart microgrid that uses the power management device (PMD) on the consumer's end and a central controller on the generation side, is enabled to implement the process of maximum power point tracking in a distributed fashion. MPPT, as depicted by FIGS. 5A-C, is a technique commonly used to maximize the power output of variable power generation sources by modifying load creating conditions for the generation source that force it to output the maximum power that can be derived based on the available sunlight or wind speed respectively. For example, solar panels have a maximum power point for a particular amount of solar radiation. If a consumer tries to draw more current from the panel than what is available at the maximum power point, then the voltage across the panel drops significantly and the total power from the panel also drops down.

Similarly, if the current drawn is reduced too much, then the voltage of the panel approaches its open circuit voltage, which also reduces the product of voltage and current and hence reduces power output. To prevent these conditions, the prior art uses expensive maximum power point trackers to control the output voltage and current of the panels in order to maximize the power output. Typically, these maximum power point trackers are current controlled DC-DC converters that control the output current of the system to maximize output power. MPPTs are also known to be installed centrally where a system has its central storage or from where it sells back power to the grid.

As opposed to the prior art, in the disclosed invention, use of expensive maximum power point tracker is eliminated and MPPT is implemented in a distributed manner through intelligent communications between the central controller (39), the fanouts (38) and the PMDs, which interalia makes the inventive system more efficient. In one embodiment, the maximum power point tracking for solar arrays is implemented as under:

The central controller (39) measures the DC voltage and DC current of the array of solar panels. By multiplying the voltage and current, the central controller (39) measures the power output of the solar array.

The central controller (39) then sends a signal to the fanout (38)s to increase their power consumption by a small amount. This signal is typically in the form of a percentage.

Each fanout then transmits this signal to all of the PMDs that it is controlling.

The PMDs, based on the state of charge of their batteries and the signal describing the % increase in power, tune their in-built digital potentiometer to increase the power going into their local storage. If their storage is full, then they can also directly control power going into devices such as heaters, air conditioners, fridges etc. which inherently have slack.

The fanout collects information from the PMDs on how much power consumption has been increased and relays this information back to the central controller. If the total power increased is less than what the central controller warranted, then the fanout sends a further increase signal to the PMDs and does this till the power is increased to the same amount that the central controller required.

The central controller now again measures the total power output of the panels. If the load increased is much more than the panels could handle, then the voltage of the panels is likely to go down significantly, and this would lead to an overall fall in power output. In this case, the central controller transmits commands to the fanouts to reduce power consumption till the panels start outputting the same levels of higher power as earlier. Conversely, if the power output went up, the central controller asks the fanouts to further increase their power consumption till it detects the peak power position of the solar array.

To ensure grid stability, a central storage (battery) may also be installed in the system. The size of this storage depends on the size of the microgrid and the time it takes to receive data from all the fanouts and PMDs. With the central storage, the peak power can easily be detected by adding a meter to measure the power coming out of the central storage. As long as there is no power coming out of the central storage and all power is coming out from the panels, the central controller continues to command the fanouts to increase their consumption. The moment the central storage starts supplementing the power output of the panels, the central controller asks the fanouts to reduce power. The object of this MPPT process is to always allow maximum power to flow out of the generation source, which implies that minimum or zero power should be supplied from the central storage, thereby reducing the capacity vis-à-vis cost on central storage.

In a further embodiment of the invention, a process for detection of power theft in the smart microgrid interfaced with a cluster of PMDs is provided. Firstly, the inventive PMDs are configured to be tamper-proof. In one embodiment of the invention, the PMDs have a light sensor and this sensor is covered with the casing of the PMD. As soon as an unauthorized person opens the casing, the PMD shuts itself off and sends a tamper signal to its fanout, which in turn relays this signal to the central controller. The central controller through GSM informs the grid operator which meter has been tampered, who can then take appropriate action. Alternatively, a touch sensor, electrical contact or any other form of sensing device that can identify when a meter casing is opened, can be used to detect meter tampering after which the tamper signal is propagated in the system through communication.

However, the second type power theft which is known as "Distribution Line Tampering", constitutes stealing power directly from the lines or externally tampering with the PMD's meter without opening the casing. The current invention is capable, as depicted in FIGS. 6A-B, of detecting and curbing this form of theft as well. The smart microgrid of the invention typically has more than one distribution line and each line covers multiple consumers. In one embodiment, during a no-tamper condition, the central controller communicates with the PMDs through the fanout to measure the voltage drop on the distribution wire between the generation and the PMD. This voltage drop allows the central controller to measure the line resistance between the central controller and each PMD under normal conditions Through measurement data of the line resistance, the central controller (39) determines how much power can be consumed based on generation and line losses on the microgrid. The central controller, through communication with the PMD and fanout, also determines the consumption by each fanout (38) and their PMDs. If the sum of line losses and consumption of the PMDs/fanouts is more than the total power coming out of the central controller, then the central controller generates a tamper flag, and informs the grid operator via text message through GSM or any other form of communication to the grid operator's monitoring system which of the distribution lines has been tampered and if required turns off power supply on that distribution line. The central controller can keep power off for a while and start supply again to see if tamper condition has been removed. If it still exists, the central controller continues to keep the power supply off.

As shown in FIG. 4, a smart microgrid comprises one or more energy generation sources (43, 44). If it is a DC microgrid and one of the generation sources produces AC power, then this generation source is connected to a rectifier that converts the AC power into DC power corresponding to the distribution voltage of the microgrid. If the generation source is DC, then no rectifier or voltage converter is necessary as the distribution voltage can be made to match the generation voltage to avoid any energy losses due to additional conversions. Conversely, if it is an AC microgrid and generation is in DC, then an inverter (40) is needed to convert the DC power into the AC voltage used for power distribution.

If there is also an AC generator generating power at a voltage different than the distribution voltage, then a transformer and phase synchronizer (not shown) is used before supplying power to the microgrid. The power generated, AC or DC then flows through a central controller (39) using an electrical wire. The output of the central controller (39) is connected to a plurality of fanouts (38) each assigned for a group of PMDs (A,B,C) using distribution wiring through which power flows between the central controller (39) and the fanouts (38). The fanouts (38) are then connected to all the PMDs (A,B,C) using distribution wiring to distribute power to all the PMDs to run the loads. To allow the central controller(39) to communicate with the fanouts (38) and the fanouts (38) to communicate with the PMDs, a communication link is setup between these devices. This link can be wired or wireless. The central controller (39), fanout (38) and PMD(A,B,C) have communication hardware inside them to which this wired or wireless link is attached. For example, if the link is wired, then in one embodiment the central controller (39), fanouts (38), and PMDs (A,B,C) can have RS485 transceivers. If the link is wireless, the central controller (39), fanouts (38), and PMDs' (A,B,C) can have wireless modems such as radio transceivers, Zigbee modems, Wifi modems, or anything else that allows wireless data transfer.

The central controller(39) can also be connected to a long distance wireless transceiver (45) such as GSM modem which allows remote monitoring of the microgrid as the central controller (39) can now send data collected in the microgrid to a remote central server (not shown) from where this data can be easily accessed. The smart microgrid may be provided with a central storage (42), and a charge controller (41).

As shown in FIG. 1, the Power Management Devices (A), at the user's end comprises at least one circuit protection (1), a switch (2), and a main meter (4). At the user end, the PMD(A) comprises, a local storage (7) controlled by a battery manager (6), and an on-off switch (5). Each PMD(A) has a controller (17) for monitoring and controlling communication with the grid central controller (39), ensuring maximum generation and equitable distribution of the power including metering, theft prevention, distributed maximum power point tracking, and revenue management. PMD(B) interfaced to a AC-grid similarly comprises a circuit protection (30), a switch (31), and a meter (32) at grid operator end, and a local storage with a battery manager (7,6), a battery charger (33), a DC-AC inverter (16), at least one DC-DC converter (29), and on-off switches (34) at the user end, including the microcontroller (17). PMD(C) interfaced to hybrid grid (AC+DC) comprises two each sub-meters (32,4), two circuit protection (30,1), switches (31,2), a main meter (37), and one each DC-DC, and AC-DC converter (36), a battery pack with battery manager (6,7), a DC-DC converter (14), a DC-AC inverter (16), a plurality of switches (11,12,15) including a microcontroller (17).

The micro controller section (17) of the PMD(A,B,C) collects, processes, and stores power data, displays relevant information to the user, communicates (18,27) with the outside world (such as the utility grid and activation device), controls actuators such as relays (20) on the PMD, and interfaces (21,23,22) with auxiliary devices such as tamper detectors (25). The central element the controller (17) is the processor (28), with peripheral circuitry to supplement the functionality of the microcontroller (28). The major components of the controller section (17), which may be internal to the microcontroller (28) or implemented in the peripheral circuitry, are:

Analog-to-Digital Converter (21) to sample the voltage and current waveforms of the power signal and transmit them to the microcontroller (17). The ADC (21) also may be used to sample other useful signals such as temperature, backup battery voltage, light levels, etc;

Digital Inputs and Outputs (I/O) to control external devices (such as relays, switches) and receive external signals (such as those from pushbuttons or tamper detection devices);

Non-Volatile Memory (NVM) to store relevant parameters and for datalogging. This includes EEPROM (generally used for parameter storage), flash memory (generally used for datalogging), or any other memory technology which stores data in the long term;

Grid Communication Interface (18) to allow the microcontroller (17) to communicate with the utility grid. This may be implemented as a wired interface (ie RS-485, Ethernet, etc.), power-line interface, or wireless interface (ie Zigbee, optical, etc.);

Activation and Debugging Interface (27) to allow the microcontroller (17) to communicate with credit recharge devices and in-field debugging devices. This may be implemented as a wired interface (ie RS-232, USB, etc.) or wireless interface (ie Bluetooth, infrared, etc.);

Real Time Clock (19) to keep track of the time and date.

Grid Communication Interface

The GCI relays information to and from the utility grid. Information sent to the utility grid from the PMD may include self-identification information, power and energy usage, tamper information, and other relevant data. Information sent to the PMD from the utility grid may include requests for data, control commands (such as those for distributed load management algorithms), time synchronization commands, etc.

Activation and Debugging Interface

The activation and debugging interface (27) allows further interaction with the meter than the user interface provides. In one embodiment, it is a close-range communication interface used by devices in direct proximity to the PMD. In this embodiment, the activation and debugging interface (27) is comprised of an infrared transceiver on the PMD, which can communicate with an external device called the Activation Dongle. Activation Dongles contain power credits and are used by grid operators to recharge the meters with additional credits for users with pre-paid accounts. As the name implies, this interface (27) may also be used to gain additional information about or debug PMDs.

User Interface

The user interface (22) informs the users of relevant power usage and account information. This information is displayed on a screen, with additional indicators such as LEDs if necessary. In one embodiment, the screen is a twisted-nematic (TN) numeric LCD screen, with several LEDs to indicate various things.

Conventionally, this interface would display information such as power usage in watts and energy usage in kilowatt-hours. However, since these are pre-paid meters and to improve consumer understanding of power consumption, the power and energy information can be displayed in unconventional units related to money and time rather than absolute engineering units. According to one embodiment of the invention, the screen alternates between three quantities: current power usage, expressed as credits/hour; total running time remaining, taking into consideration current power usage and credits remaining in the account; and finally, credits remaining in the account.

Also, an LED is provided which blinks at a rate proportional to power consumption to supplement the credits/hour information displayed on the screen. Finally, LEDs may be provided which indicate fault conditions such as meter overload or tampering.

In a preferred embodiment of the invention, the known technique of distributed storage is implemented without the use of any additional structural device, for de-centralizing energy storage in the grid, which interalia allows extending the power storage to the end nodes (homes, businesses, etc.) and only retaining a very small amount at the central storage (42) for grid stability. Each end node (PMD) contains a battery (7) and an inverter, allowing it to use its own battery power under the command of the central controller (39). This technique utilizes a reliable, fast communication means throughout the grid to execute distributed load management algorithms and ensure judicious energy distribution on a low-generation day. Distributed storage also allows a more scalable grid infrastructure as the amount of storage in the grid scales directly with the number of users.

According to the invention, the batteries are placed at all end nodes (PMDs) of the grid and controlling the PMDs through communication between the microcontrollers (17) and the central controller (39), a precise control is exercised over the amount of power that the grid is consuming from the generation sources at any given time. Not only can the charging of the batteries (7) be turned on and off, but an entire PMD can be seamlessly switched from grid power to battery power, thereby temporarily eliminating its consumption of power from the grid. This is especially useful in microgrids with limited, non-scalable generation sources such as solar power. This form of backup capability although can be provided by the centralized storage (42), however, the distributed storage adds to the capability of automatically alternating grid usage between different end nodes, thereby fairly rationing a limited amount of energy between all of the different end nodes of the grid.

In order to implement the distributed storage technique, a battery manager (6), a battery charger (33), and an inverter (16) are provided at the end node including a communication means (23) to control these devices in the end node (PMD) from the central controller (39). In one embodiment of the present invention RS-485 communication protocol is used on the microgrid to connect all of the end nodes (PMD) with the controllers in the grid. Different form of wired communication, power line communication, or a wireless network is also possible.

Additionally, a central controller (39) is provided in the grid which keeps track of the power, energy, and general state of all of the nodes in the grid.

The method of operating the invention can be described with reference to the drawings as under:

FIG. 1, when the PMD receives high voltage DC, the power goes through the Circuit Protection (1), the Switch (2), and the Isolated DC/DC Converter (3), which are connected using wire or through traces on a PCB. The DC-DC converter (3) outputs a low voltage DC, which interalia powers the micro controller (17) and another parallel trace on the PCB or a wire goes through the main meter (4). The main meter (4) is connected to the controller (17) which sends voltage and current readings to the Analog to Digital Interface (21) of the controller (17). These readings are used by the processor (28) inside the controller (17) to meter the power going through the PMD(A).

After the main meter (4), power goes into the loads through various AC and DC outputs (8, 9, 10) as shown in FIG. 1. Power going into these outputs (8, 9, 10) is controlled by the controller (17) through a switch driver (20) that turns switches (11,12,13,15) on or off. If the switches (11,12,13, 15) are on, power goes into the load.

If the load requires 13VDC it goes directly into the load through an output DC connector (8) since the output of the isolated DC-DC converter (3) is 13VDC as well. If the load requires 5VDC (as necessary for USB powered loads), a DC-DC converter (14) is used to convert 13VDC to 5VDC and then through an output DC connector (9) power goes into the load. If the loads require AC input, then power goes through a DC-AC inverter (16) that converts 13VDC to the appropriate AC voltage (240VAC in one embodiment) and then power goes into the load through an output AC connector (10).

The DC output voltages are attached to separate voltage dividers that are in turn connected to the analog pins of the controller (17). The controller senses changes in the output voltage and whenever there is an overload state, the output voltage falls since the DC-DC converters (14) in the PMD are current limited. When this voltage falls below a threshold, the appropriate switches (11, 12, 13, or 15) are shut down through a signal that goes from the switch driver (20) to the switch. After the main meter (4), power also goes in parallel to the local storage (7) through a switch (5) and a battery manager (6). This battery manager (6) is connected to the local storage (7) and it sends data on battery's state of charge, input and output current to the controller (39), which helps the controller (17) to evaluate how much power should be sent into the battery (7). The switch is again controlled by the controller (17) through its switch driver (20) to turn battery charge/discharge on or off.

In another embodiment the method of working the invention, when the PMD(B) is receiving AC-input, as depicted in FIG. 2, is that the power after the main meter (32) goes into the battery charger (33) and/or to the 240V output. The power from the battery manager (6) goes into switches (11,12) from where through the DC-DC converter (14) the PMD(B) provides DC outputs to the loads. The remaining steps of operation are substantially similar to that performed by PMD(A).

In a still another embodiment, the method of working the invention, when the PMD(C) is receiving hybrid power (AC+DC), as depicted in FIG. 3, from the grid, is that different forms input power AC or DC come into the PMD(C) through different input connectors. They pass through circuit protection (1,30) and they get metered separately. After metering, the AC power goes directly into the AC output through a switch (31) or it goes into the combined converter (36) to generate the different DC outputs. When the switch (31) is open, the switch (15) is closed and when the switch (15) is open, the switch (31) is closed.

The high voltage DC power goes into the combined converter (36) to get converted into usable low voltage DC. The remaining steps of the method to be performed by the PMD (C) are identical to that of PMD(A).

Best Mode and Exemplary Means of Use

An example as to of how the different elements of the invention combinedly and synchronously operate the inventive power-management device in a smart microgrid system, is provided herein below:

A plurality of Solar panels (43) are provided for generation of energy say total 2 kWp capacity;

A central storage (42) of capacity of at least 500 Wh is located to provide 15 minutes of backup for grid stability during which the distributed storage procedure optimizes power generation from the panels (43) and ensures grid stability;

A DC-DC converter (41) provides a constant voltage to the inverter, which is equivalent to the battery voltage;

A Central inverter (40) converts DC power from the solar panels (43) and/or batteries (7) into 240VAC;

A central controller (39) is installed in the power generation station enabled to meter total power transmitting into the grid and communicates with different devices of the smart microgrid, including the PMDs.

Main distribution line carrying 240VAC.

At least one Fanout (38) from where the wires branch out to reach a cluster of consumers, the number forming the cluster can be increased/reduced based on population density and power consumption, User-end of the PMD(B) is provided to each consumer being connected through the fanout (38), A Local storage device (7) inside every PMD is arranged at user-end being connected to the PMD with a battery charger, An Optional inverter may be placed at consumer-end to provide AC backup power when microgrid power is unavailable, and connected to the PMD through a switch, Appliances are connected to the power coming through the PMD, and A Communication medium, for example, twisted pair wires to implement RS485 communication protocol, from the central controller to the fanout and from the fanout to every user-end.

In the inventive smart microgrid system having the Power Management devices as disclosed herein, the generated power flows in following sequences:

Solar Panels->DC-DC converter->Battery and/or Inverter->Central Controller->Fanout->Individual PMDs->Appliance and/or local battery and/or inverter.

Similarly, the communication commands/information can flow between the following devices:

| Sender | Receiver |
| --- | --- |
| Central Controller | Fanout |
|  | DC-DC converter |
| Fanout | PMD |
|  | Central Controller |
| DC-DC Converter | Central Controller |

This is only one example of how communication can flow. It is possible for every element in the grid to interact with each other directly as well if necessary. This hierarchical communication technique makes the grid more modular and scalable. For instance, if a PMD(B) has to be added to the grid, it only needs to indicate its presence to the fanout (38). If a full fanout (38) has to be added, the addition of the fanout (38) is to the central controller (39) by sending an appropriate command.

Possible Technical Solutions Provided by the Invention under Different Conditions:

Condition A

This condition assumes that Power consumed by the appliances used by the consumers is less than the solar panel's total generation. Without the PMD and central controller, the solar panel is disabled to operate at its maximum power point (MPP) leading to wastage of power. Alternatively, the PMD and the central controller, when operating together, shall be enabled to implement the solutions as under:

The central controller (39) communicates with the DC-DC converter (41) to measure the total power output of the solar array (43).

If historical generation data are available, the system is enabled to predict the total likely generation of the solar array at a location, and at that time a step climbing technique is then used to reach the maximum power point.

If the central controller (39) detects that the PMU is not operating at MPP, a command is transmitted to the fanout (38) to increase its total power consumption.

Every fanout (38) has a pre-allocated energy capacity based on the total number of PMD (A,B,C) to be supplied with power. Based on the total energy that a fanout (38) has already consumed at a particular time of the day, from its daily quota/ration, the central controller (39) prioritizes the fanouts (38) in order of least consumption of their daily quota. For example, if there are three fanouts (38) that have a quota of 3000 Wh, 1500 Wh and 5000 Wh and they have consumed 20%, 50% and 70%, respectively of their assigned capacities, the central controller (39) commands for example, fanout 1 to increase its power consumption with a higher priority than fanout 2. Similarly, fanout 2 is provided power with a higher priority than fanout 3. This technique ensures an equitable power distribution.

Similar to the fanouts (38), the PMDs (A,B,C) are allocated energy capacities as well. Using the same priority technique, as described in (d) hereinabove, the fanouts (38) ask the PMDs (A,B,C) to increase their power consumption by specific percentage, or by an absolute amount.

The PMDs increase their power consumption by storing this extra power in their local storage (7) by changing their battery charging current. The PMDs can also use this extra power by operating additional appliances like refrigerators, air conditioners, raising water through a pump, at consumers end.

The central controller (29) then measures the new power consumption.

The central controller (29) also measures the power being drawn from the central storage (42).

If power is not drawn from the central storage (42), then that would indicate that the consumption is still less than the potential power generation. So the central controller (39) once again asks the fanouts (38) to further increase power consumption.

The process is repeated till some power is drawn from the central storage (42), at which point the central controller (39) ask the fanouts (38) to marginally reduce their consumption to avoid draining out power from the central storage (42).

The fanouts periodically rotate between different PMDs to ensure equitable distribution of power to all the PMDs connected to it.

Condition B

This condition assumes that Power consumed by the appliances through the PMDs is more than what the power generators can generate.

This situation indicates that a significant amount of power is drawn from the central storage (42), The central controller (39) asks the fanouts (38) to reduce power consumption using the priority technique as described in Condition A hereinabove.

The fanouts (38) then ask the PMDs to stop charging their batteries (7),

If the reduction in power is still not sufficient, the fanouts (38) shut down power supply to the PMD's (A,B,C) using a priority scheme described in Condition A, The PMDs having no or less power supply, automatically switch over to use their local storage (7) to continue power supply to the appliances.

This condition is maintained until the central controller (39) asks the fanouts (38) to increase their power consumption The fanouts periodically rotate between different PMDs to ensure equitable distribution of power to all the PMDs connected to it.

Condition C

This condition presumes that a PMD is tampered to steal electricity:—

As disclosed earlier, the PMD has a tamper detector (25) on it which can be in the form of a light sensor (25), which is connected to the PMD's controller.

As soon as the PMD casing is opened to tamper the internal circuitry, the tamper detector/light sensor detects an unauthorized access and sends a signal to the micro controller(17), The micro controller (17) shuts down the main switch stopping power supply to the appliances, The micro controller (17) also sends a tamper flag to the central controller (39) indicating that the PMD(A,B,C) has been tampered, The central controller (39) communicates a notification to the grid operator about this tamper, In the case that the tamper is done by disconnecting/corrupting the communication between the PMD and central controller (39), the central controller (39) communicates a notification to the grid operator for the same.

Condition D

This condition applies when power is stolen by tampering the distribution lines (see FIGS. 6A and 6B):

The central controller (39) communicates with the fanouts (38) and the PMD (ABC) to measure the transmission wire resistance between the generation station and every connection, This combined resistance allows the central controller (39) to evaluate how much power is consumed on the distribution lines for a certain amount of power drawn by the entire grid, The central controller (39) meters the total power drawn by each fanout (38) on the microgrid.

For example, the total power going into the microgrid from the central controller (39) to a fanout (38) is 1.5 kW. The total power loss due to resistance on the distribution lines for this load is 105 W (7% as calculated by the central controller (39) based on wire resistance calculations). Now, say, the fanout (38) indicates indicating that it is drawing only 1 kW by calculating the combined power drawn from each PMD. Thus, the central controller (39) detects (39) that 395 W of power is being stolen on the distribution line.

The central controller (39) then communicates this tamper message to the grid operator who inspects the line to detect theft.

The central controller (39) can also be programmed to turn power supply off for this entire line and periodically check if the tamper condition is removed by briefly turning the power supply back on.

An Example of Distributed Storage Technique Used by the Invention:

Consider a 2 kWp solar-powered smart microgrid serving 10 homes. On an average on a clear sunny day, assume that the solar panels generate a total of 10 kWh. Each of the 10 homes has a PMD that is attached to a local storage. These PMDs have an energy quota, which is decided based on the type of connection the consumer selects, consumer preferences, or it can also be set based on historical data of the consumer's power consumption.

Since renewable sources of power such as wind and solar have variable and substantially unpredictable generation levels, a distributed storage technique and a maximum power point tracking technique (see FIGS. 5A,5B,5C) makes power distribution equitable and more reliable for such sources.

The energy quota of all the consumers when added up is say, 10 kWh, which the microgrid is likely to generate and sell on an average day of full sunshine. The problem arises when the generation levels increase or decrease, which is what this invention addresses.

A decrease in generation level from 10 KWh implies that less than 10 kWh can be sold to the consumers over the day. However, the essence of the invention is that whatever power is available be distributed equitably among all the users and simultaneously debar a small fraction of users from exausting all the generation by consuming more power within a short period. To ensure equitable distribution, according to the invention, the central controller (39) monitors what percentage of energy quota allocated to a PMD is used up at a certain point of time, and accordingly prioritizes power supply to those PMDs who have used a lower percentage of their daily quotas. Below is a hypothetical data snapshot of the daily quotas of 10 consumers and how much they have used at a particular time of day:

| PMD | Quota (kWh) | % Used Up* | Energy Left (kWh) |
|---|---|---|---|
| 1 | 1.00 | 30% | 0.70 |
| 2 | 0.50 | 50% | 0.25 |
| 3 | 0.75 | 10% | 0.68 |
| 4 | 2.50 | 40% | 1.50 |
| 5 | 0.50 | 20% | 0.40 |
| 6 | 1.50 | 80% | 0.30 |
| 7 | 1.00 | 45% | 0.55 |
| 8 | 0.25 | 10% | 0.23 |
| 9 | 1.50 | 40% | 0.90 |
| 10 | 0.50 | 90% | 0.05 |

This information is automatically recorded in the grid according to the invention, as the PMDs are metering the amount of energy consumed and the fanout and central controller can get this data from them at any point.

The maximum generation that this hypothetical microgrid can do is 2 kW. Now, the problem arises on two counts:

Generation is Low & Power Demand is High

Assuming that instantaneous generation in the grid has reduced to 1 kW, i.e. 50% of peak capacity which is the maximum power point of the solar panels at this stage. Hence, if the system attempts to draw more power, then the panels' voltage vis-a-vis the total power output shall reduce because the panels are disabled to wont operate at their MPP. Further assuming that the instantaneous energy demand at this instant is 1.5 kW, the microgrid has to decide where to channel the available power (1 kw) and how to meet the excess demand of 0.5 kw.

Without limiting the scope of the invention, application, and presuming that all these 10 PMDs are connected to a single fanout (38), the central controller (39) transmits a signal to the fanout (38) indicating the amount of power that the fanout (38) can consume (in this case 1 kW). The fanout (38) then sends commands to individual PMDs prioritized by decreasing % energy quotas used up by the PMDs, to start switching over from microgrid supply to their local storage (7) to continue powering their connected loads. The fanout (38) can also send commands to the PMDs, in the same priority order as described hereinabove, to reduce the charging current of their local storage to reduce their overall power draw. If reducing the charging current reduces the total power draw to the desired level, then the PMDs don't need to be turned off from grid supply. Once the fanout (38) measures that the total power consumption has come down to 1 kW, then it stops sending 'turn off' signals or 'reduce charging current' signals to the PMDs. This process is repeated periodically and the set of PMDs asked to reduce their power consumption are changed for equitable energy distribution.

This simple prioritizing and rationing technique ensures that available power is always distributed evenly and equitably to PMDs and also ensures operation of the power generators at their maximum power point.

Generation is High & Power Demand is Low

Assume that the instantaneous generation is 1.5 kW which is the maximum power point of the solar panels at this stage. However, the demand for power is only 1 kW at this point. Hence if the system draws lesser power, then the solar panels' voltage will increase, current will reduce and the panels will not operate at their maximum power point, leading to likely wastage of potentially excess power generation. Since demand is less than supply, the microgrid has to decide where to channel the available excess supply.

In this case, the central controller (39) sends a signal to the fanout (38) indicating the amount of power consumption that the fanout (38) must increase. The fanout (38) then sends commands to individual PMDs, prioritized by increasing % of energy quotas used up to start charging or increase the charging current of their local storage (7). Once the fanout (38) measures that the total power drawn has come to the level commanded by the central controller (39), the fanout (39) stops sending these commands. This process is repeated periodically to update the set of PMDs that must start or increase the rate of charging their local storage. The prioritizing and equitable distribution technique according to the invention further allows operation of the solar panels at their maximum power point.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated.

The invention claimed is:

1. A smart power grid system for a cluster of power management devices used for efficient monitoring, controlling, metering including equitable distribution of electrical power to consumers corresponding to demand-generation status by eliminating power theft, the smart power grid system comprising:
   at least one of power generation source including at least one of one or more non-conventional variable energy generation sources and a traditional A.C. power grid;
   a central controller; and
   a plurality of power management devices, wherein each power management device of the plurality of power management devices comprises:
   a. a microcontroller having a processor, a plurality of interfaces, a switch driver, a tamper detector, and a logic for backup power source;
   b. a circuit protection means;
   c. a metering device to measure at least one of AC power, DC power, and a combination of AC and DC power supplied by the smart power grid system and consumed by the consumers;
   d. a plurality of switches for preventing overloading of the smart power grid system and illegal consumption of power, and for monitoring power supply from the power grid, each switch of the plurality of switches operable by the switch driver;
   e. a local storage means, having a charge monitoring circuit, for temporarily supplementing a shortfall of power generation or power consumption lower than power generation; and
   f. a grid communication interface allowing each of the power management devices to communicate with the central controller, each grid communication interface being at least one of physically connected or remotely connected, to implement an intelligent demand-response, to identify an area of power loss or theft, to perform remote trouble shooting, and to update payment for power consumption,
   the central controller, disposed in at least one of wireless or wired communication with the microcontroller of each power management device, is configured to maximize power output from the at least one power generation sources, to prioritize each power management device through associated fanout, to maximize distributed storage, including equitable distribution of power, and to maximize remote stack management to prevent power-theft.

2. The smart power grid system as claimed in claim 1, wherein the central controller is connected to a remote wireless transceiver.

3. The smart power grid system as claimed in claim 1, comprising a central storage including a charge controller.

4. The smart power grid system as claimed in claim 1, wherein, when the smart power grid system is an AC power grid, the system is interfaced to at least one power management device having at a user end, a battery charger, a DC-AC inverter, and at least one DC-DC converter.

5. The smart power grid system as claimed in claim 1, wherein, when the smart power grid system is a hybrid grid interfaced to at least one power management device, the power management device is provided with a submeter for metering A.C. power supply and a submeter for metering D.C. power supply and a combined converter.

6. The system as claimed in claim 1, wherein the central controller in communication with the microcontroller of each of the plurality of power management devices is enabled to:
   a. measure a total output from the at least one power generation source;
   b. implement maximum power point (MPP) tracking;
   c. assign an energy capacity to each fanout and each power management device based on generation-consumption capacity;
   d. transmit signals to each fanout to at least one of increase power consumption, if the power management device is not operating at MPP, and reduce power consumption, if power consumption is higher than power generation;
   e. prioritize each fanout based on pre-allocation capacity, power generation, and power consumption at each point of time;

f. prioritize each power management device through the fanouts and transmit signals to each power management device to increase or decrease power consumption based on generation-consumption status, including the pre-assigned capacity of the power management device;

g. allow the power management devices to consume excess power through charging of local storage or supply to consumers when generation is higher, or alternatively, allow the power management devices to stop charging local storage, including rationing power supply to the consumers when generation is lower than demand;

h. measure any power-drawn under an increased power consumption scenario, and further measure consumption of power from the central storage by the power management devices;

i. measure any decrease in power consumption by the power management devices when consumption is higher than generation;

j. transmit further commands to the power management devices to increase power consumption under a low generation condition, or stop supply of power to the power management devices if a first decrease does not correspond to lower power generation and allow the power management devices to supply power to the consumers from their corresponding local storage.

7. The system as claimed in claim 1, wherein the plurality of power management units are structured and arranged in a stack to generate a variety of output voltages.

8. The system as claimed in claim 1, wherein the system is activatable and deactivatable for a fixed period of time by at least one externally passing a waveform of a particular frequency or transmitting specific commands readable by the system, and wherein after expiration of a fixed activated time, at least one power management device turns off automatically.

9. The system as claimed in claim 1, wherein each of the plurality of switches comprises a MOSFET that turns the power management units on or off.

10. The system as claimed in claim 1, wherein the variable energy generation source is selected from a group consisting of solar panels, grid supply, micro wind generators, bicycle dynamos and micro hydro power plants.

11. A multipurpose power management system, comprising:
at least one power management device each of which is activatable and deactivatable individually or jointly in combination with another power management device, and each of the power management devices being configured to be coupled to a variety of input energy sources;
a controller configured for providing regulated operational mechanisms;
a plurality of convertors, each converter of the plurality of converts coupled to a corresponding battery of each power management device, configured for providing output voltages that are accessible individually;
a plurality of filters, each filter of the plurality of filters coupled to a corresponding battery to filter signals for activation/deactivation or recharging; and
a plurality of sensing circuits to sense external signals and to selectively activate or deactivate the power management system,
said at least one power management device capable of communicating with other power management devices and enabling creation of a central grid power management system.

12. The system of claim 11, further comprising:
a system housing;
a microcontroller, as a specific type of controller, which control signals to provide for at least one of activation of the power management system and deactivation of the at least one power management device through protection against theft detection and overloading or short circuiting of the at least one power management device compromising the system; and
a plurality of connectors positioned on a top and a bottom of the housing to stack a plurality of power management devices for higher power output.

13. The system of claim 11, wherein the charge controller includes a comparator that compares a battery voltage of an individual power management device to a reference voltage and, if the battery voltage exceeds a reference voltage, the comparator provides an output that determines whether the device should be on or off depending on whether there is a fault condition or not.

14. The system of claim 11, wherein the one or more input energy sources charge the battery without required conversion or external voltage regulation.

15. The system of claim 11, wherein power management device can be configured for a particular type of input energy source to enable secure rental through charging station businesses.

16. The system of claim 12, wherein in response to a power management device being configured for a particular type of input energy then the plurality of power management devices do not charge from another input energy source.

17. The system of claim 11, wherein a plurality of power management devices are provided in a stack and generate a variety of output voltages.

18. The system of claim 11, further comprising:
grid theft detection as one of the operational regulated mechanisms of the controller.

19. The system of claim 11, further comprising:
overload detection capability as one of the operational regulated mechanisms of the controller.

20. A multipurpose power management system, comprising:
a system housing;
at least one power management device, each power management device individually activatable and deactivatable, having a battery, and configured to be coupled to a variety of input energy sources as part of a distributed storage network for a central grid structure;
at least one controller configured for providing the following capably regulated operational mechanisms:
a. charging the battery of each power management device,
b. detecting grid theft, and
c. detecting energy overload;
a plurality of convertors coupled to the battery of each power management device and configured for providing output voltages that are accessible individually;
a user interface component to enable various information feed backs on each power management device and the power management system;
a plurality of user switches for external activation and control;
a plurality of filters to filter signals for at least one of activation/deactivation and recharging, each filter of the plurality of filters coupled to at least one battery of a power management device;

a reverse blocking diode coupled to each battery to prevent current from flowing from the battery to any of the input energy sources;

one or more MOSFETs to turn on/off each of the at least one power management device; and a plurality of sensing circuits to sense external signals and to selectively activate or deactivate the system.

21. A method for operating a multipurpose power management system, comprising:

providing at least one power management device, each power management device activatable and deactivatable individually or jointly in combination with one or more power management devices and operationally configured to be coupled to a variety of input energy sources; and providing the following regulated operational mechanisms using at least one controller or series of controllers:

implementing a plurality of convertors coupled to a battery of each power management unit and configured for providing output voltages that are accessible individually, enabling and using a user interface component to enable various information feed backs on the units and overall system, using a plurality of user switches for external activation and control;

filtering signals for at least one of activation/deactivation and recharging, using a plurality of filters coupled to the battery of at least one power management device, preventing current flowing from the battery to any of the input energy sources using a reverse blocking diode coupled to the battery, turning each of the power management units on or off using one or more MOSFETs, and sensing external signals and selectively activating or deactivating the system using a plurality of sensing circuits.

22. The method of claim 21 an operational regulated mechanism further comprising:

charging the power management unit's battery.

23. The method of claim 21 an operational regulated mechanism further comprising:

monitoring the system's grid from theft through a power management device.

24. The method of claim 21 an operational regulated mechanism further comprising:

detecting energy overload on the individual devices and of the system as it relates to a micro power grid.

25. An automatized method of detecting power theft in a power producing, smart microgrid having a central controller and a plurality of fanouts, each fanout coupled to a plurality of power management devices, each power management device having a microcontroller in communication with the central controller, the method comprising the steps of:

a. measuring a line resistance between the central controller and each power management device;

b. determining an amount of power generated and line losses for the smart microgrid;

c. determining consumption of each of the plurality of fanouts and each of the plurality of power management devices;

d. detecting an unauthorized access by comparing the amount of power generated with the line losses and the consumption of the plurality of fanouts;

e. transmitting a signal to the central controller to shut down and detect a point of emanation of the unauthorized access; and f. temporarily turning off of a power supply if the unauthorized access is not eliminated.

26. A process of automatically achieving maximum power point tracking (MPPT) for variable power generation sources in a smart microgrid having at least one central controller and a plurality of power management devices, each power management device having a microcontroller, the process comprising the steps of:

a. measuring voltage and current and measuring a power output by multiplying the voltage and the current;

b. measuring, by at least one central controller, upon receipt of a signal from at least one fanout, a status of percentage power change by the PMDs;

c. computing and transmitting a signal through a controller to the fanouts for necessary modifications; and d. providing, by a metering means, a central storage on the at least one central controller.

* * * * *